United States Patent [19]

Hills

[11] Patent Number: 4,472,719

[45] Date of Patent: Sep. 18, 1984

[54] ECM MULTIPLE-TARGET RETRODIRECTIVE ANTENNA

[75] Inventor: Richard A. Hills, San Diego, Calif.

[73] Assignee: The United States of America as represented by the Secretary of the Navy, Washington, D.C.

[21] Appl. No.: 329,262

[22] Filed: Jan. 15, 1973

[51] Int. Cl.³ .............................................. G01S 7/38
[52] U.S. Cl. .................................. 343/18 E; 343/370
[58] Field of Search ............... 343/18 E, 100 TD, 370

[56] References Cited

U.S. PATENT DOCUMENTS 4,121,221 10/1978 Meadows ........................ 343/370 X Primary Examiner—T. H. Tubbesing
Attorney, Agent, or Firm—Robert F. Beers; Ervin F. Johnston; Harvey Fendelman

[57] ABSTRACT

A linear antenna array receives incoming microwave signals which are coupled to a wide-angle, microwave lens to produce a received beam pattern in azimuth. The beam pattern is crystal detected and log video amplified to produce an output signal comprising directional information in the amplitude level. The directional information is processed in a logic processor which converts information into binary voltage levels which are gated to appropriate switch drivers and to automatically decide the discrete received beam detecting target signal and to activate a switch which will enable ECM signals to be transmitted to radiate in the desired transmit beam. ECM signals which are gated through the switch apparatus by inputs from the logic processor are coupled to a second microwave lens apparatus which forms a beam pattern to be transmitted which is retro-directive with respect to the received beam pattern. The beam is transmitted by a linear antenna array.

5 Claims, 6 Drawing Figures

ECM MULTIPLE-TARGET RETRODIRECTIVE ANTENNA

BACKGROUND OF THE INVENTION

The rapidly increasing missile threat to surface vessels has resulted in a critical need for improved ECM antennas; specifically, existing missile threats to surface ships has created a requirement that ECM increase radiated power and simultaneously counter threat signals which are separated in azimuth. Existing ECM antennas comprise semi-omni antennas which cannot radiate the effective powers desired when fed with existing amplifiers. Others are single beam directed antennas which require an operator to steer the beam to a threat sector. Multiple beam antennas have been developed; however, weight restrictions for small ships limit their utility. Also, millisecond beam switching time limits the multiple target response to a prediction gating program for known threat signals. Response to multiple threats of unknown signals is accommodated by feeding beams in parallel, thereby reducing the effective radiated power. Phased ray technology offers the advantages of electronically scanned, high gain beams; however, the resultant narrow beam with its associated high effective power is extremely sensitive to directional error. Although milliradian beam control is straightforward, the absolute alignment of the transmit beam axis, with a bearing axis determined by an independent measurement of a single pulse, is subject to error. This error severely degrades the effective radiated power of a pencil beam at the target location thereby imposing a high technical risk for such an approach.

SUMMARY OF THE INVENTION

ECM, multiple-target, retrodirective antenna apparatus are disclosed. The apparatus comprises receive, linear antenna array having outputs connected to a wide-angle, microwave lens. Each output port of the lens corresponds to an individual beam pattern in azimuth. Signal detection at any output port of the lens apparatus by an individual receiver is identified with a corresponding beam by a logic processor. The processor programs a switching network such that an ECM, RF signal from an external source is gated to a transmit microwave lens input port which corresponds to the receive lens output port detecting an incoming signal. The above action results in retrodirective transmission of the received signal by a transmit linear array antenna. The receive and transmit linear antenna arrays comprise a plurality of antenna elements mounted in horizontal plane. Each element is connected by an equal length transmission line to the microwave bootlace lens which consists of two parallel conducting surfaces spaced less than one-half wavelength apart. Output ports located along a 120° output sector establish a beam pattern configuration in azimuth and a corresponding discrete focal point for each received beam can be defined. Each focal point is connected to an individual receiver to produce angle or directional information for detected signals. Each receiver comprises a crystal detector and a log video amplifier. The directional information is electronically processed by a logic processor which converts analog voltages from each receiver to binary voltages which are then gated to switching apparatus which receives at its input ECM signals from an external source. The logic processor is programmed to automatically decide the discrete received beam detecting the target signal and to activate the switch in such a manner that the transmitted signal will be radiated in the desired transmit beam. The gated ECM signal can be transmitted and supplied to a transmit microwave lens to form the retrodirective feed pattern which is transmitted by a transmit linear array identical to the receive array.

OBJECTS OF THE INVENTION

It is the primary object of the present invention to provide an improved ECM antenna which can be used to increase radiated power and to simultaneously counter threat signals which are separated in azimuth.

It is another object of the present invention to provide apparatus for use in ECM systems and comprising a multiple target retrodirective antenna which can function without an operator.

It is still a further object of the invention to detect a microwave amplitude distribution associated with an array of receiving antenna ports and to close a single-pole, multiple-throw microwave switch to that port in a matched array of transmit antenna ports which corresponds to the receiving antenna port having the maximum amplitude.

Other objects, advantages and novel features of the invention will become apparent from the following detailed description of the invention when considered in conjunction with the accompanying drawings.

DESCRIPTION OF THE PREFERRED EMBODIMENT

Figure 1:
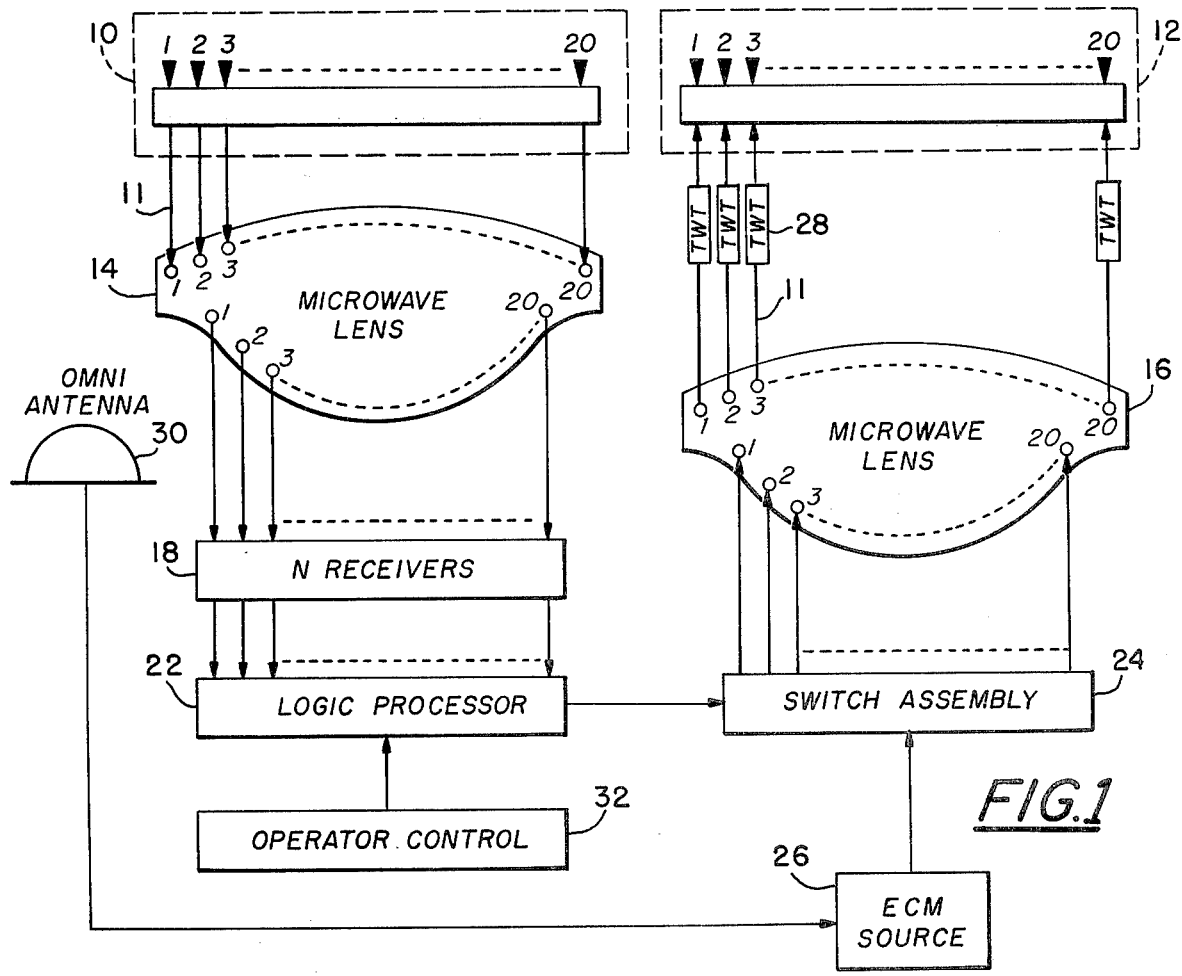
FIG. 1 is a simplified schematic diagram of the ECM antenna system to be described hereinafter.

The system shown in FIG. 1 comprises separate receive and transmit linear arrays 10 and 12 which are connected to the wideangle, microwave lenses 14 and 16, respectively. The output port of each lens corresponds to individual beam patterns in azimuth, and signal detection at any output port of the receive lens array 14 is performed by N individual receivers 18 and is identified with a corresponding beam by the logic processor 22.

The logic processor programs a switch network 24 in such a manner that an ECM RF signal from an external source 26 is gated to the transmit lens port which corresponds to the receive lens port which is detecting the signal. This action produces a retrodirective transmission of the receive signal. High ERP, effective radiated power, for the transmit beam can be achieved by the addition of travelling wave tube amplifiers 28 to each transmit array element.

The transmitted ECM signal is derived from other equipment which is connected to receive signals from a separate omni-antenna 30. An operator control unit 32 can be included for the selection manually or automatically of beam switching, beam lockout, and as a display for beam activity.

As stated above, the receive and transmit antenna apertures comprise linear antenna arrays 10 and 12, respectively. Each array can have, for example, twenty array elements in a horizontal plane and forming an 8° horizontal beam width at broadside. The element pattern can be shaped in the vertical plane by means of a flare at the aperture. Actual vertical shaping depends on the final requirement but must be less than 40° in order to realize an aperture gain of 28 db with twenty elements. The linearly polarized wave which is radiated by the aperture can be rotated in the plane containing the electric vector by means of a wire grid embedded in the radome.

The array elements are connected by means of the equal-length transmission lines 11 to the "bootlace" microwave lenses 14 and 16. The structure and operational description of the "bootlace" lens are described in detail in "Wide Angle Microwave Lens for Line Source Applications", Volume AP-11, page 623-633, November 1963, *IEEE Transactions on Antennas and Propogation*. Suffice it to say therefore that the geometry of the lens is such that for a given angle of arrival of a plane wave a focal point exists and is invariant with frequency. As the angle of arrival changes, the focal point also changes following a circular arc. Output probes located along the arc establish a beam pattern configuration in azimuth.

The design technique for locating these probes is to first determine the number of ports required by dividing the 120° sector coverage by the array beam width at the specified cross of the level, and second, to select the lens geometry for a probe spacing that satisfies the circuit isolation and sidelobe response.

An important feature of the lens is its versatility in accommodating a wide assortment of gain and beam pattern combinations. For example, beam requirements are satisfied by the number of antenna input ports, and the beam patterns are implemented by output port locations and feed design.

Once the desired spatial coverage is selected, the corresponding discrete focal for each beam is defined. Each focal point or output port is connected to an individual one of the N receivers 18 to produce angle or directional information for detected signals at the output port.

Figure 2:
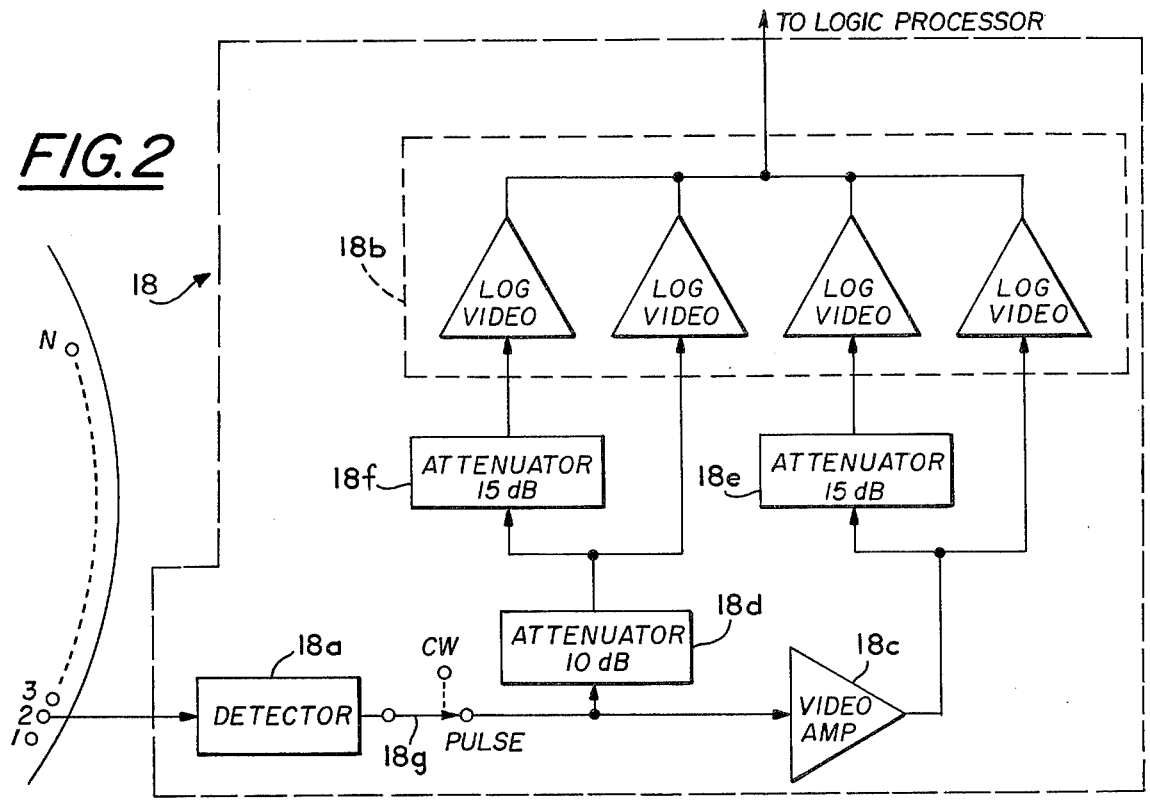
FIG. 2 is a simplified block diagram of one of the receivers connected to the output port number 2 of the receive microwave lens.

As illustrated in FIG. 2, each receiver channel comprises essentially a crystal detector 18a and a log video amplifier. The crystal detector can comprise a high-sensitivity, broadband Schottky barrier diode with RF limiters preceding the diode to prevent burnout. Tangential receiver sensitivity is defined as the input signal level required for positive logic switching action, and an input signal at the detector of $-35$ dBm corresponds to a power density at the antenna aperture of $-14$ dBm/meter$^2$.

The diode detector operates in a square-law fashion only over a portion of the input range; therefore, an RF dynamic range of 46 dB typically results in a 40 dB output voltage range.

The log video amplifier 18b comprises four, 15 dBV range, log stages having their outputs summed. The video amplifier 18c and the three attenuators 18d, e, and f, function to adjust the input signal range so that it falls within the operating range for each amplifier unit.

Receiver tracking capability is a critical requirement for accurate beam resolution, and receivers should track each other within approximately one-half dB. Identical receivers can be for both the I and J frequency bands, and a switch 18g for CW (dual-mode) operation can be implemented in the J-band receive unit. This switch can be used to connect a CW signal to a chopper circuit (not shown) for pulse feed to the receivers.

The directional information produced at the output of each receiver and contained in the output signal amplitude level of each receiver, is coupled to the logic processor 22 which converts the analog signal voltage output into a binary voltage level which is gated to the switching apparatus 24. This action is programmed to automatically decide the discrete receive beam detecting a target signal and to activate a corresponding switch in the apparatus 24 which will enable the transmitted signal to radiate in the desired transmit beam. A flow-chart illustrating the above control process is illustrated in FIG. 3.

The logic processor sequence is started by receipt of the receiver output. Level comparator circuitry performs threshold detection and quantization of the detected signal. In a manner to be described hereinafter, the data bits are shifted to NOR-gate circuitry for decisions as to whether single-beam or dual beam detection is to be performed. After the appropriate detection is performed, a digital output activates corresponding switching circuitry to thereby transmit energy in the desired transmit beam. The above description will become clearer and more meaningful when considered in conjunction with FIGS. 4 and 5.

The logic processor can comprise a comparator quantizer and emitter-coupled logic integrator circuits (ECL). ECL circuits are recommended because they offer the fast processing time which is a critical requirement for pulse-to-pulse switching of the target signals.

Figure 3:
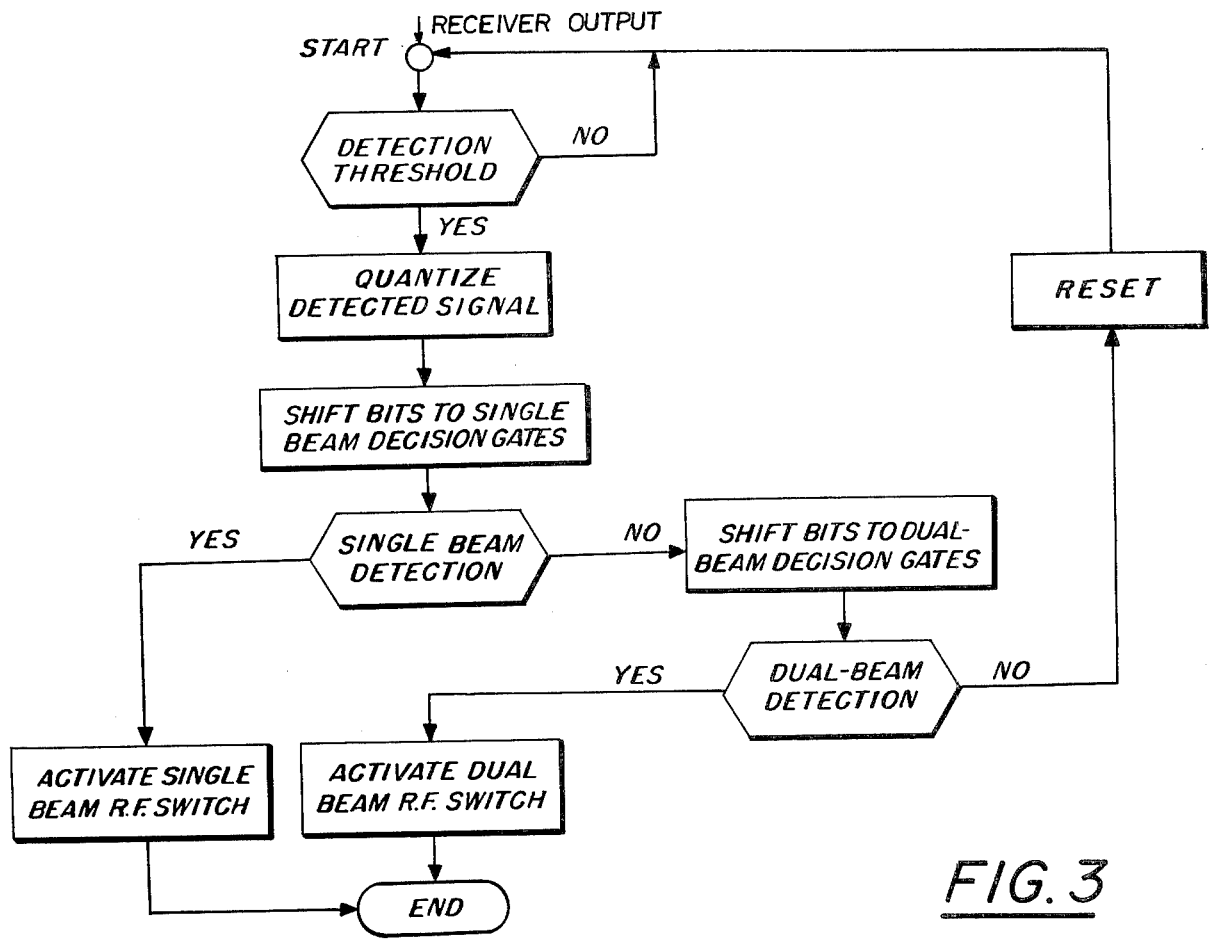
FIG. 3 is a flow-chart of the functional processes performed by the logical processor shown in FIG. 1.
Figure 4:
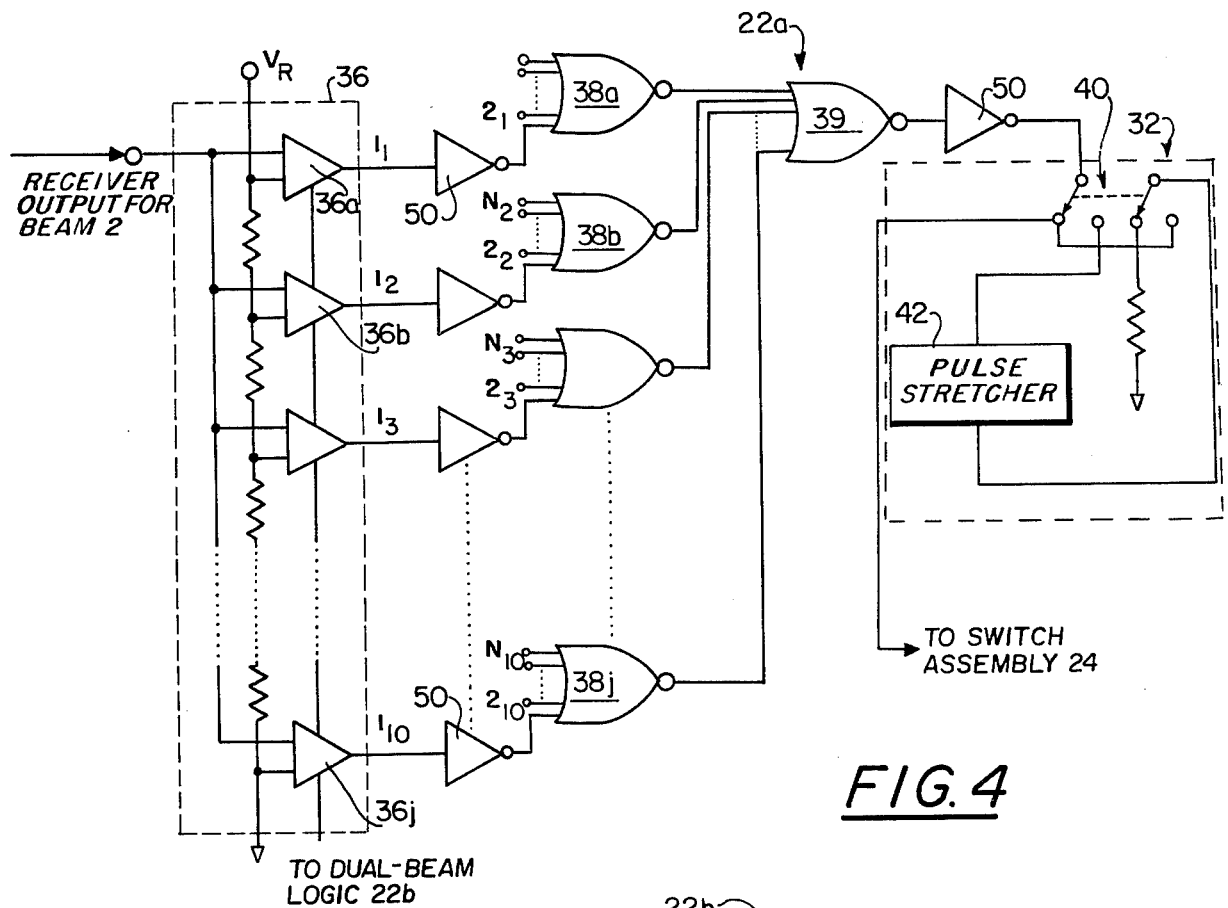
FIG. 4 is a logical diagram of a single-beam switch component of the logical processor.

FIG. 4 illustrates the logic circuitry 22a proposed for implementing single-beam switching as illustrated in FIG. 3. Identical logic circuitry, but with different gate connections, would be utilized at the output of each of the twenty (N=20) receivers. The level comparator 36 should be operable with a reference voltage of, for example, 2.5 volts, divided in a manner which permits the quantizing of receiver output voltages into ten binary levels $1_1-1_{10}$, where each level corresponds to a 5 dB change in RF signals.

Each of the ten comparators in the level comparator circuit 36 feeds its output into a different one of the ten NOR-gates 38 which function as a beam coder. For example, the top-most comparator 36a in FIG. 4 and the top-most comparator in the other nine comparator circuits (not shown) are connected to the NOR-gate 38a. Likewise, the bottom comparator 36j and the nine other bottom comparators (not shown) are connected to the NOR-gate 38j. Each of the ten NOR-gates 38a-38j thus receives ten bits as energy is received. Each gate, 38a-38j, produces a "0" if more than one of the bits is a "1" and produces a "1" if only one "1" and nine "0"s (in any sequence) are applied to it, thereby signifying single-beam detection as indicated in the flowchart of FIG. 3.

Each of the ten NOR-gates 38a-38j feeds its output to the NOR-gate 39 which functions a decoding gate. It likewise produces a "1" output if it receives any combination of nine "0"s and one "1". The "1" produced is then passed on to the switch assembly 24 by the operator-controlled switch 40 and pulse stretcher 42.

Figure 5:
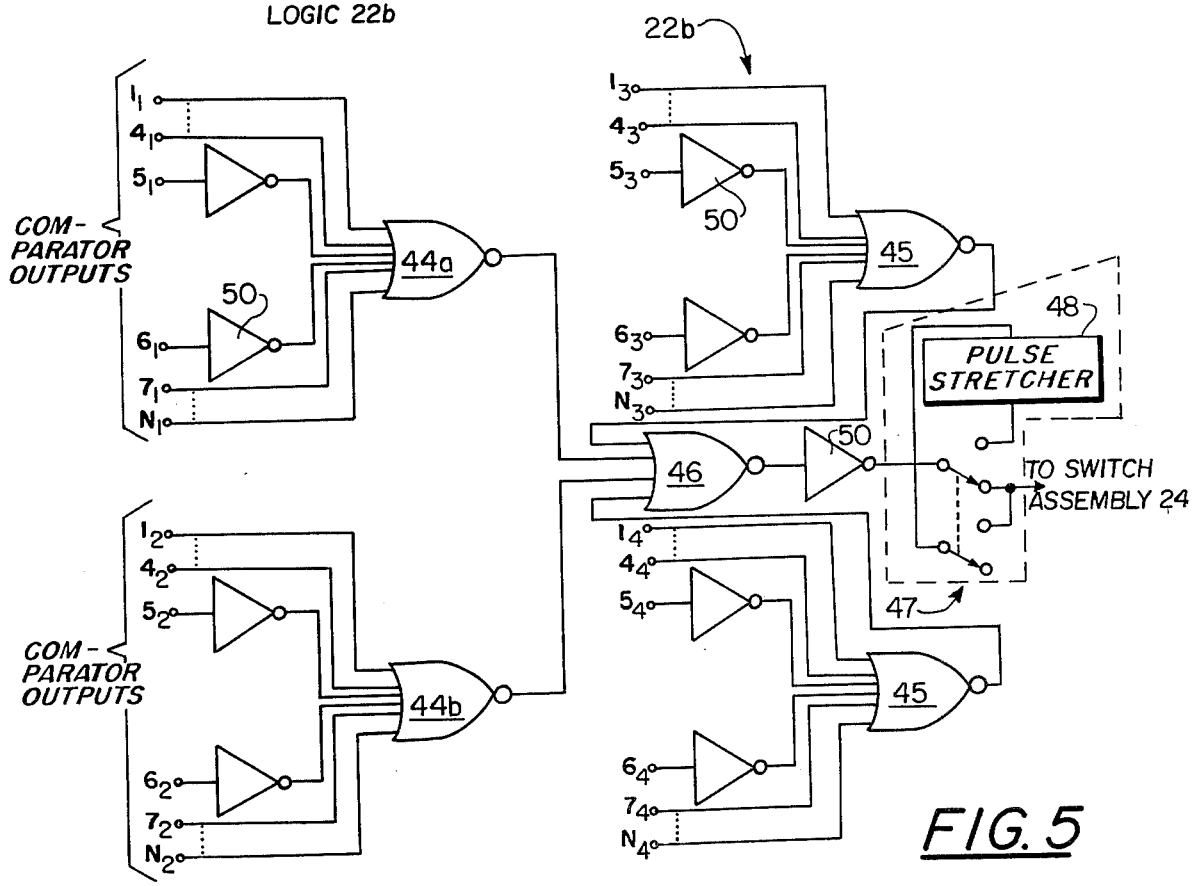
FIG. 5 is a logical diagram of the dual beam component of the logical processor of FIG. 1.

If an inhibit decision is arrived at by the NOR-gate circuitry of FIG. 4, dual-beam processing is achieved by the circuit of FIG. 5. As shown, each of the coding NOR-gate 44 (six are not shown) receives the output from each of the ten comparator circuits corresponding to the same port on the receive antenna. For example, each of the ten comparators corresponding to port 1 feeds its digital output to the gate 44a. The NOR-gates, produce a "1" output only when two or more bits received by it are "1"'s. Likewise, the decoder NOR-gates 45a and 45b produce a "1" and activate the switch assembly 24 only upon receipt of two or more "1"'s from the coding gates.

Output logic levels of the comparator should be compatible with the input requirements of the NOR log gates 38 which comprise the single-beam coder and the quantization chosen should enable single-beam decision gating over broadside beamwidth of approximately 5°. Target signals falling outside this beam width will cause adjacent beam receiver response to be quantized at the same level, thereby inhibiting single beam gating. This condition is sensed by the beam-split circuit or dual-logic circuit 22b which then gates a switch in the assembly 24 to feed the transmitted RF signal to the corresponding adjacent input ports of the transmit lens 16.

A diagram of the dual-beam logic is shown in FIG. 5. The pulse stretchers illustrated in FIGS. 4 and 5, respectively, function to extend the switching period beyond the signal pulse width in order to accommodate range-gate-pull-off ECM and which can comprise a portion of the operator control unit 32. It should be appreciated that the coding gate logic is shown with reference to its connection to ports 5 and 6 of the antenna 14 and that six more gates would be required for connecting to the remaining comparator outputs. The comparators, NOR gates, and inverters 50 are conventional items. It should be noted that a different comparator is required for each receiver, and that the number of NOR gates for single-beam gating is equal to eleven times the number of beams and the number of NOR gates required for beam-splitting is equal to eleven times the sum of the number of beams minus one. It should be further noted that a critical design requirement for the logical processor is adequate shielding from intense local RF shields.

The switch assembly 24 comprises switches which establish an RF circuit path between the ECM signal source 26 and the transmit lens 16 input ports. This action completes the beam switching function. The switches can comprise stripline circuits and fast-switching pin diodes. For example, a double-pole, double-throw switch wherein circuit paths are established by diode biasing and wherein diode locations are at one-fourth wavelength intervals can be used in the switch assembly 24. Stripline circuitry in the form of a SPIGT switch could also be used advantageously. A diode is located at each junction in the stripline pattern. Expected switching time for the commercially available diode is in the order of ten nanoseconds.

The transmit microwave lens 16, the travelling wave tube amplifiers 28, and the transmit linear antenna array 12 comprise the transmit antenna assembly. The lens and radiating elements are essentially the same design as those in the receive antenna assembly which has already been described.

The TWT's are a special feature of the transmit antenna. Full array gain acts upon the sum total power of the TWT's in generating effective radiating power (ERP); consequently, ERP requirements can be satisfied by adding amplifiers or increasing array gain. Installing these tubes in the appropriate I and J band units between each array element and lens input port results in an ERP of 2 mw peaks for I band and 200 kw for J band. Another advantage is the realization of high-speed, pulse-to-pulse switching permitted by the reduced RF power levels at the switching element; however, accurate positioning of the gain axis for each transmit beam to coincide with the gain axis of each receive beam is required to optimize ERP at the target signal location. Therefore the feasibility of this approach for generating high ERP is dependent upon a determination of the effects on antenna pattern and gain performance for the transmit array by the variance and transfer functions for a set of amplifiers. According to antenna theory farfield antenna pattern and gain performance depend upon the phase and amplitude distribution of electromagnetic energy across the aperture. Pattern or beam position in the plane containing a linear ray is determined by the phase distribution whereas antenna gain and pattern shape, including sidelobes, are related to the amplitude distribution.

Thus it can be seen that a new and novel ECM antenna has been disclosed.

Obviously many modifications and variations of the present invention are possible in the light of the above teachings. It is therefore to be understood that within the scope of the appended claims the invention may be practiced otherwise than as specifically described.

What is claimed is:

1. Multiple target, retrodirective antenna apparatus comprising:
   first antenna means for receiving incoming microwave signals;
   first, wide-angle, microwave lens means connected to the output of said antenna means and being responsive thereto to produce a selectively predetermined receive beam pattern in azimuth;
   receiver means connected to the output of said lens means for detecting said receive beam pattern and for producing analog directional information corresponding to detected beam patterns;
   ECM signal source means;
   second microwave lens means;
   switch means operatively connected to the output of said ECM signal source means and to the output of said receiver means and being responsive to said directional information to couple ECM signals to said second lens means,
   whereby said second lens means produces a transmit beam pattern which is retrodirective with respect to said receive beam pattern; and
   second antenna means connected to the output of said second lens means to transmit said transmit beam pattern.

2. The apparatus of claim 1 wherein said first and second antenna means comprise linear arrays consisting of a plurality of antenna radiating elements positioned in a horizontal plane.

3. The apparatus of claim 2 wherein said first and second microwave lens have a plurality of input ports and output ports equal to the number of said plurality of radiating elements and where each of the radiating elements of said first antenna means is connected to a different one of the input ports of said first lens means by an equal-length conductor and where each of said output ports of said second lens is connected to the input of a different one of said radiating elements of said second antenna means.

4. The apparatus of claim 3 wherein said receiver means comprises a plurality of identical receivers, each of which is connected at the input to the different one of said output ports of said first lens means.

5. The apparatus of claim 4 wherein each of said receivers comprises a crystal detector and a log video amplifier.

* * * * *